US006542198B1

(12) United States Patent
Hung et al.

(10) Patent No.: US 6,542,198 B1
(45) Date of Patent: Apr. 1, 2003

(54) METHOD AND APPARATUS FOR OPTIMIZING VIDEO PLAYBACK AT ARBITRARY REFRESH RATES

(75) Inventors: Andy Hung, Los Altos, CA (US); Haitao Guo, Mountain View, CA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/281,631

(22) Filed: Mar. 30, 1999

(51) Int. Cl.$^7$ ................................ H04N 7/01
(52) U.S. Cl. ................... 348/459; 348/443; 348/448
(58) Field of Search ................ 348/459, 443, 348/445, 446, 441, 458, 556, 715, 911, 97; 386/131; 345/530, 538; H04N 7/01

(56) References Cited

U.S. PATENT DOCUMENTS

| | | | | | |
|---|---|---|---|---|---|
| 4,866,520 A | * | 9/1989 | Nomura et al. | ............ | 358/140 |
| 5,398,071 A | * | 3/1995 | Gove et al. | ............ | 348/558 |
| 5,418,572 A | * | 5/1995 | Nonweiler et al. | ............ | 348/446 |
| 5,428,399 A | * | 6/1995 | Robinson et al. | ............ | 348/459 |
| 5,473,381 A | * | 12/1995 | Lee | ............ | 348/441 |
| 5,633,687 A | * | 5/1997 | Bhayani et al. | ............ | 348/441 |
| 5,796,437 A | * | 8/1998 | Muraji et al. | ............ | 348/452 |
| 5,825,429 A | * | 10/1998 | Shirahata | ............ | 348/448 |
| 6,028,586 A | * | 2/2000 | Swan et al. | ............ | 345/132 |
| 6,094,227 A | * | 7/2000 | Guimier | ............ | 348/459 |
| 6,111,610 A | * | 8/2000 | Faroudja | ............ | 348/441 |
| 6,151,075 A | * | 11/2000 | Shin et al. | ............ | 348/459 |
| 6,157,412 A | * | 12/2000 | Westerman et al. | ............ | 348/558 |
| 6,188,437 B1 | * | 2/2001 | Webb et al. | ............ | 348/448 |
| 6,222,589 B1 | * | 4/2001 | Faroudja et al. | ............ | 348/448 |
| 6,304,297 B1 | * | 10/2001 | Swan | ............ | 348/556 |

* cited by examiner

Primary Examiner—John Miller
Assistant Examiner—Jean W. Désir
(74) Attorney, Agent, or Firm—Vedder, Price, Kaufman & Kammholz

(57) ABSTRACT

A frame rate converter that receives segments having an input frame rate and provides the segments at a rate of N times the frame rate, where each segment is selected from a group consisting of a frame or field, including: a storage device which stores the segments, where the segments include a first, second, and third segments; and a display device coupled to receive the segments from the storage device and to provide the first, second, and third segments, where the display device provides the first segment and then provides the second segment following completion of providing the first segment where the second segment is previously available or otherwise again provides the first segment. The frame rate converter further includes a decoder device, where the third segment includes a field that includes a top line of an alternate frame and is encoded in 3:2 format and where the decoder device adjusts a time stamp of the third segment.

20 Claims, 14 Drawing Sheets

US 6,542,198 B1

METHOD AND APPARATUS FOR OPTIMIZING VIDEO PLAYBACK AT ARBITRARY REFRESH RATES

BACKGROUND OF THE INVENTION

1. Field of the Invention

The present invention relates to video display. More particularly, the present invention relates to a method and apparatus for displaying video at an optimum frame rate.

2. Discussion of Related Art

A conventional video sequence includes a series of frames of still images. The frames appear as a continuous motion video to the human eye when displayed at a minimum rate of 24 frames/second. Conventional video display devices such as televisions and computer monitors display individual frames at a "refresh rate". Typically the refresh rate is higher than 24 frames/second. For example, televisions display video at 30 frames/second.

Frames can be displayed in progressive mode, i.e., line by line, beginning with a top line and sequentially proceeding to the bottom line. A frame can be divided into its even and odd lines, the even and odd lines being commonly known as respective "even" and "odd" fields, and the even and odd fields displayed sequentially (so called interlace mode). The human eye does not perceive the alternating display of even and odd lines of a frame as long as at least 24 frames/second are displayed.

A conventional technique for encoding 24 Hz frames for display at 30 Hz interlaced is 3:2 pulldown (hereafter "3:2 format"). In 3:2 format, four fields of a video are displayed sequentially in five fields.

FIG. 1 schematically depicts an example of display of Frames 1–3, in interlaced mode, as Fields 1–5 in accordance with the 3:2 format. For each of input Frames 1–3, field 1 represents a top field, i.e., a field that includes a top displayed line and is either an even or odd field and field 2 represents the complement of field 1. As shown in FIG. 1, field 1 of a first frame, Frame 1, is first displayed as Field 1, followed by field 2 of Frame 1 (Field 2). Then field 1 and field 2 of Frame 2 are displayed as respective Fields 3 and 4. Field 1 of Frame 2 is then repeated as Field 5 after the display of field 2 of Frame 2. Thus with 3:2 format, a first field of every other frame is repeated. Because of the repeat of the top field of every other frame, one drawback with 3:2 format is that every other frame is noticeably longer in duration (so called "jutter").

A time stamp associated with each input frame indicates when the associated field and frame is to be displayed relative to a clock signal. Hereafter the term "segment" is used to refer to a field or a frame. Displaying each segment at a time set by its time stamp ensures that displayed video speed is as intended. The time stamps are set with respect to a specified system clock frequency. In 3:2 format the time stamp of the first field of every other frame is skewed to reflect that the even field of every other frame is repeated.

Thus what is needed is a method and apparatus that eliminates jutter and displays video at a frame rate of optimum video appearance.

SUMMARY

An embodiment of the present invention includes a frame rate converter that receives segments having an input frame rate and provides segments at a rate of N times the frame rate, where the segment is selected from a group consisting of a frame or field, the frame rate converter including: a storage device which stores the segments, where the segments includes a first, second, and third segments; and a display device coupled to receive the segments from the storage device and to provide the first, second, and third segments, where the display device provides the first segment and then provides the second segment following completion of providing the first segment where the second segment is previously available or otherwise again provides the first segment.

In an embodiment, the frame rate converter further includes a decoder device, where the third segment comprises a top first field derived from a frame encoded in 3:2 format and where the decoder device adjusts a time stamp of the third segment.

The present invention will be more fully understood in light of the following detailed description taken together with the accompanying drawings.

DETAILED DESCRIPTION

An embodiment of the present invention provides a frame rate converter that receives decoded frames with an associated frame rate F and provides frames to a conventional monitor device, that displays frames in progressive mode, at a rate of R. Frame rate F represents the rate (frames/second) at which the frames should be displayed. Rate R represents the refresh rate, i.e. a number of frames/second the monitor displays. In some embodiments, a conventional graphics controller establishes the refresh rate of the monitor and in other embodiments, the refresh rate of the monitor is preset.

Figure 1:
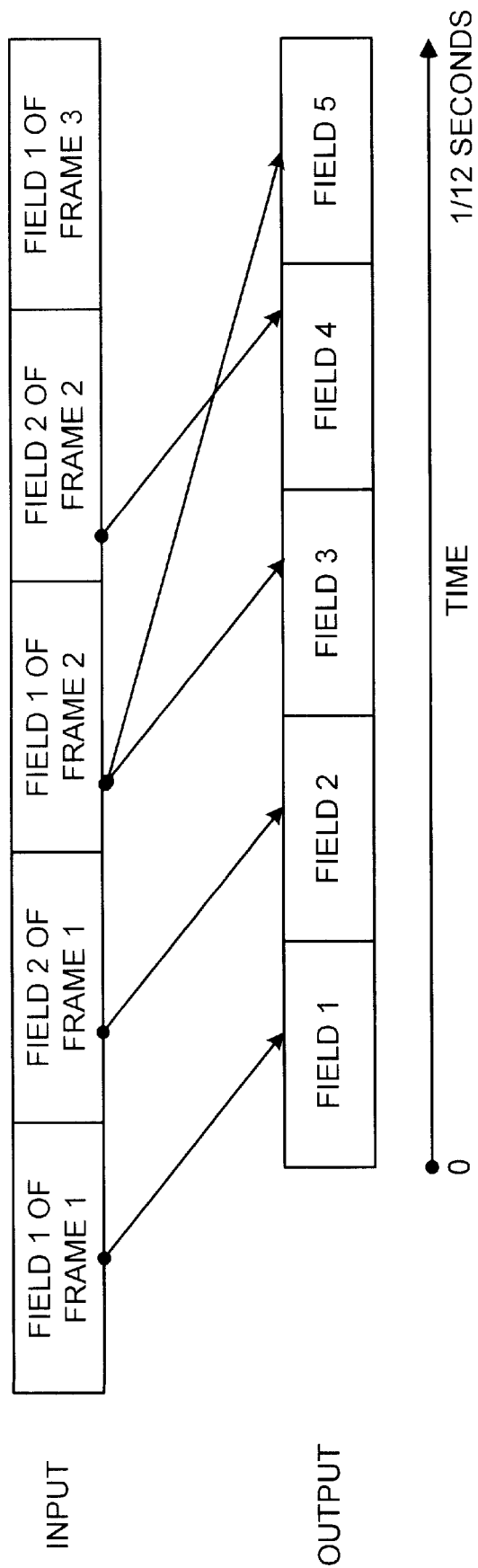
FIG. 1 schematically depicts an example of field display under 3:2 format.
Figure 2:
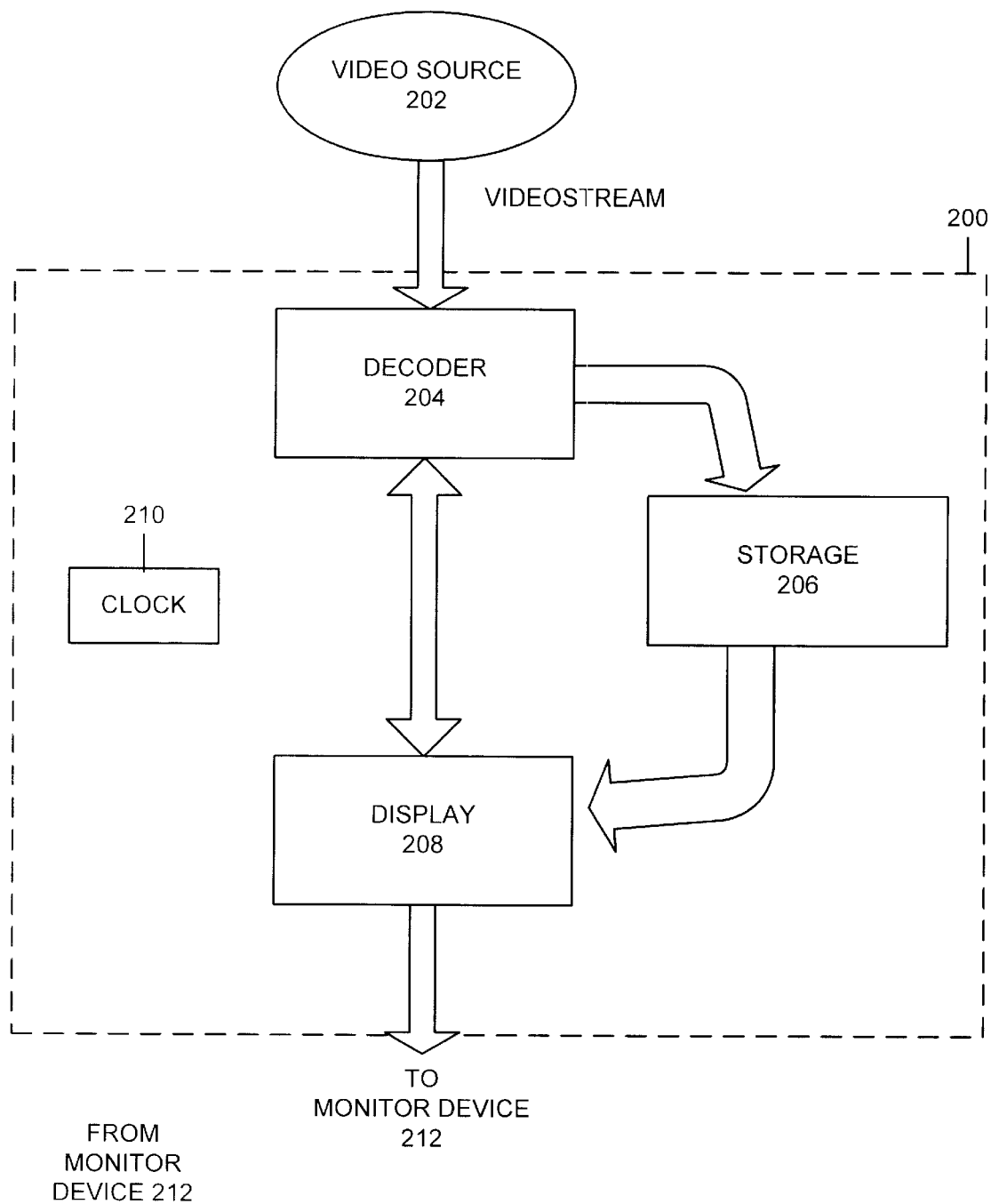
FIG. 2 depicts schematically an exemplary frame rate converter 200 in accordance with an embodiment of the present invention.

FIG. 2 schematically depicts an exemplary frame rate converter 200 in accordance with an embodiment of the present invention. Frame rate converter 200 includes a decoder device 204, storage device 206, and display device 208. In this embodiment, frame rate converter 200 provides frames to monitor device 212, as monitor device 212 displays frames in progressive mode.

As depicted in FIG. 2, conventional video source 202 provides decoded video in frame format to frame rate converter 200. A suitable video source 202 is MPACT2!™ by Chromatic Research.

Decoder device 204 receives frames from video source 202. In accordance with an embodiment of the present invention that will be discussed in more detail below, for frames encoded in 3:2 format, decoder device 204 recalculates the time stamp associated with every other frame. Decoder device 204 stores all frames in storage device 206. A suitable implementation of decoder device 204 includes logic circuitry for performing the operations described below with respect to FIG. 4, such as logic circuitry for loading frames, logic circuitry for altering time stamps, and logic circuitry for storing frames to storage device 206.

Storage device 206 stores frames from decoder device 204, communicates when a frame is to be displayed, and provides frames to display device 208. In this embodiment, storage device 206 includes data arrays for storing frames. Storage device 206 includes a 64 bit counter that counts clock cycles of system clock 210. When the value held in the counter matches a time stamp of a frame, storage device 206 communicates to display device 208 that a frame is ready for display. A suitable implementation of storage device 206 includes logic circuitry for performing the operations described below with respect to FIG. 4, such as logic circuitry for loading frames, a memory unit that includes the data arrays for storing frames, a counter for counting clock cycles, logic circuitry for communicating with display device 208, and logic circuitry for providing frames to display device 208.

Display device 208 loads frames from storage device 206 and provides such frames to monitor device 212. Display device 208 provides frames to monitor device 212 in a manner that is an accordance with an embodiment of the invention discussed in more detail later with respect to FIG. 5. A suitable implementation of display device 208 includes logic circuitry for performing the operations described below with respect to FIG. 5, such as logic circuitry for monitoring whether frames are available from storage device 206, logic circuitry for loading frames, a memory unit for storing frames, and logic circuitry for providing frames to monitor device 212.

The conventional monitor device 212 displays video in progressive mode. Suitable monitor device 212 includes for example a computer monitor.

Figure 3:
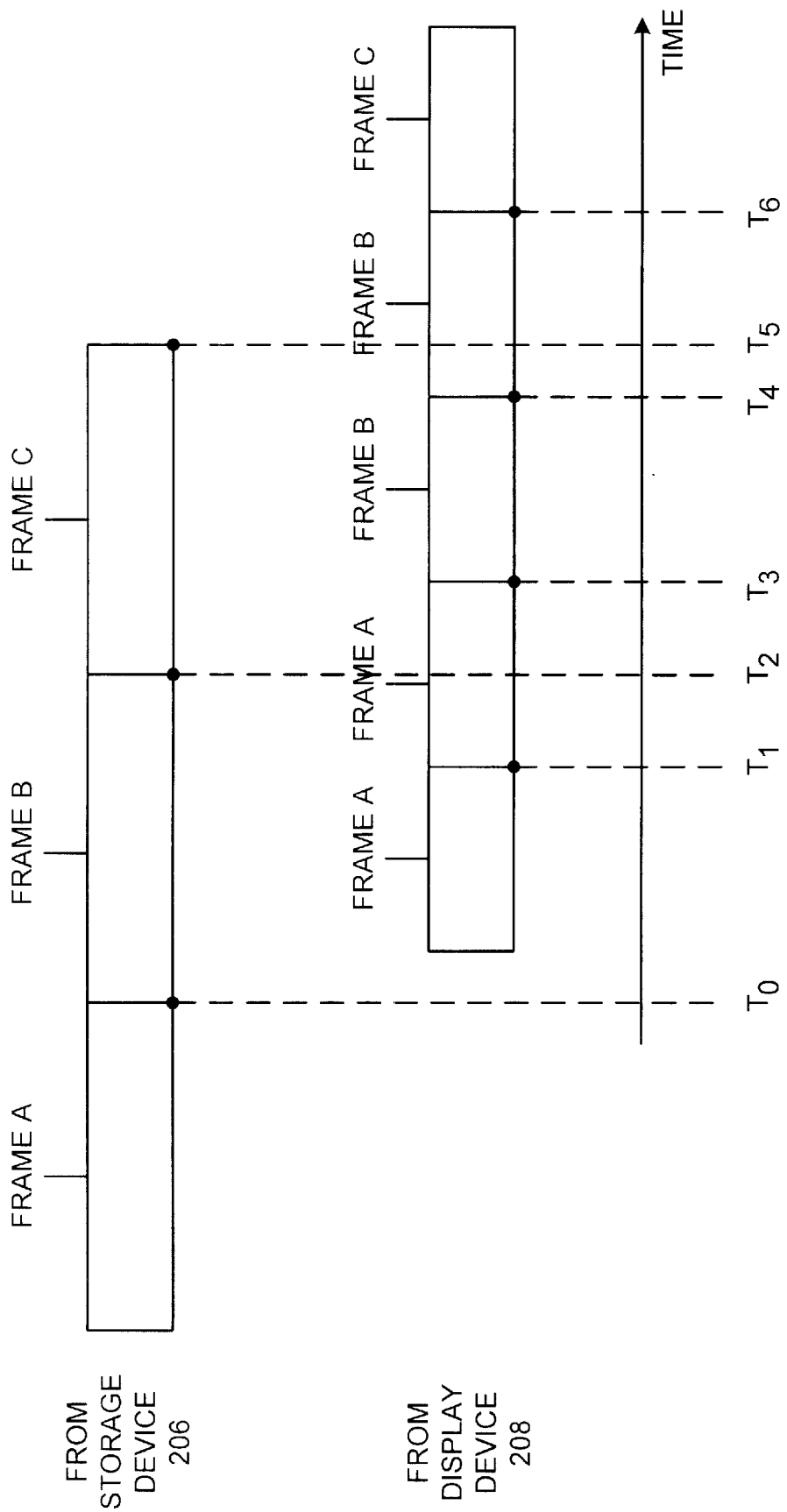
FIG. 3 depicts a timing diagram of an example showing storage device 206 signaling availability of Fields A–C at times t0, t2, and t5 as well as monitor device 212 displaying Fields A, B, or C shortly after times t0, t1, t3, t4, and t6.

The following example describes an operation of frame rate converter 200 in converting input frames having a rate F for display by monitor device 212 at a frame rate R in accordance with an embodiment of the present invention. FIG. 3 depicts a timing diagram of the example showing storage device 206 signaling availability of Frames A–C at respective times t0, t2, and t5 as well as monitor device 212 displaying Frames A, B, or C shortly after times t0, t1, t3, t4, and t6. In this example, the refresh rate R is higher than the rate F.

Figure 4:
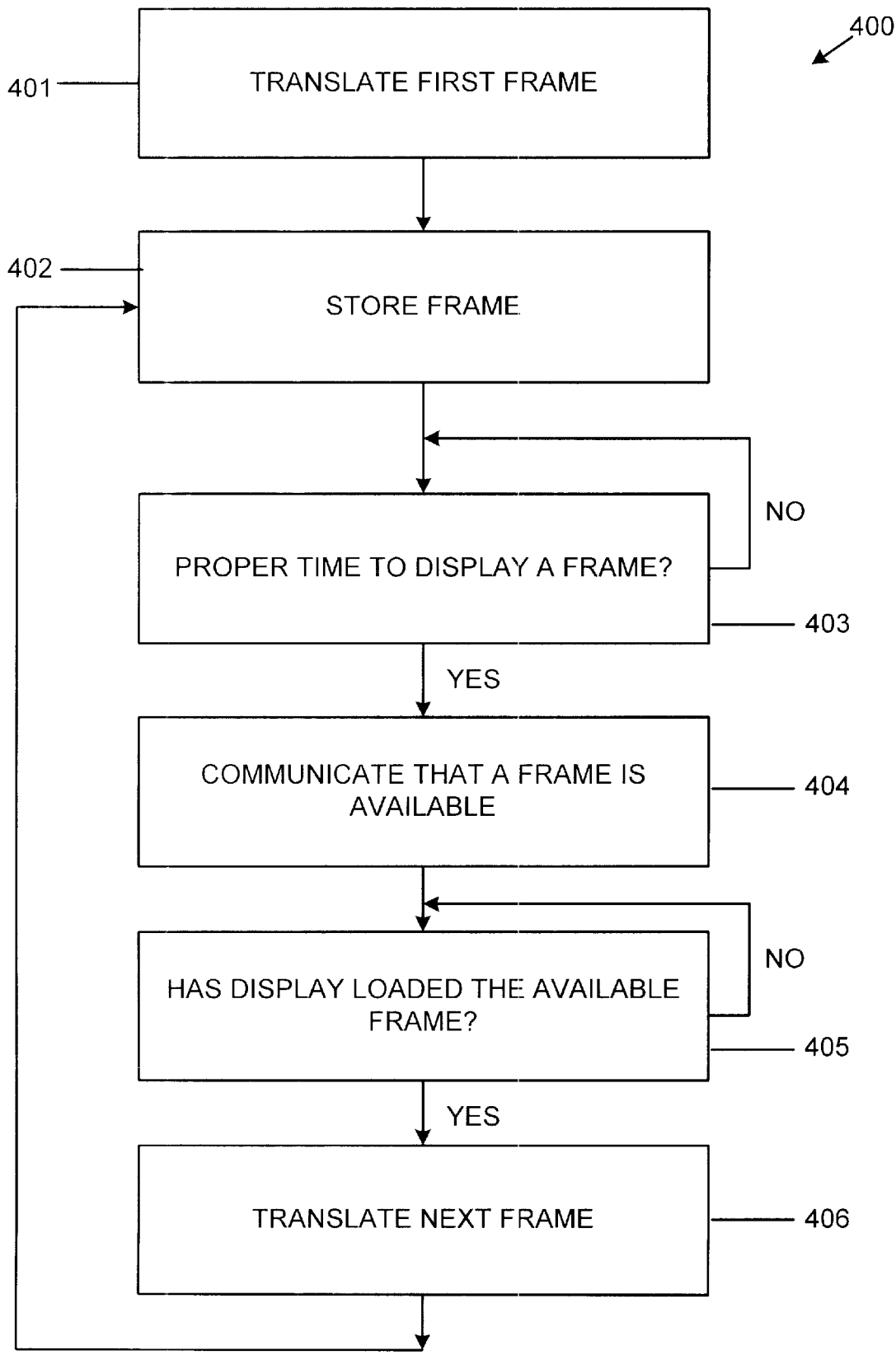
FIG. 4 depicts a flow diagram of exemplary operations of decoder device 204 and storage device 206 in accordance with an embodiment of the present invention.
Figure 5:
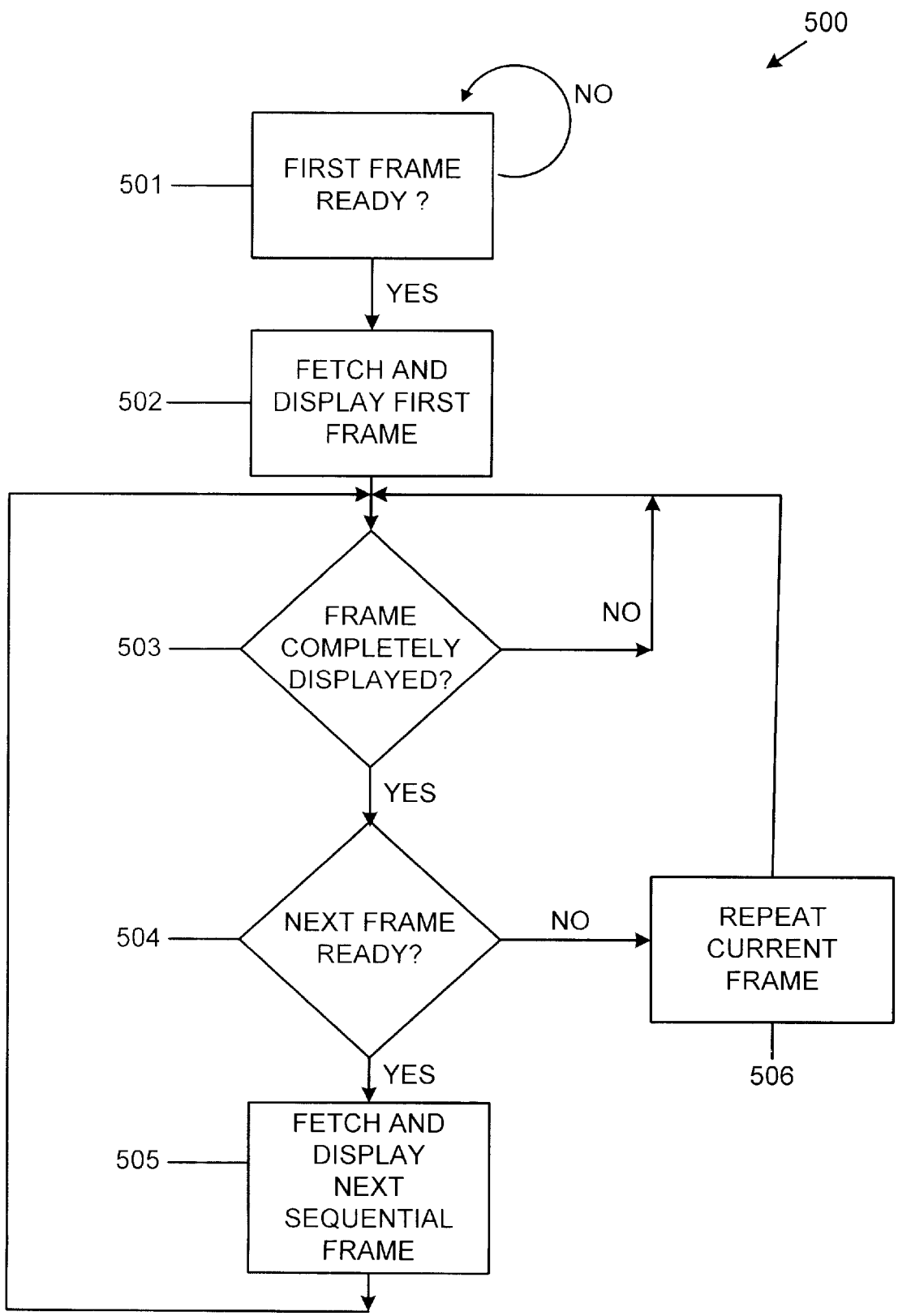
FIG. 5 depicts a flow diagram of an exemplary operation of display device 208 in accordance with an embodiment of the present invention.

FIG. 4 depicts a flow diagram of exemplary operations of decoder device 204 and storage device 206. FIG. 5 depicts a flow diagram of an exemplary operation of display device 208. In this embodiment, decoder device 204, storage device 206, and display device 208 operate independently except to coordinate frame exchange, i.e., steps 404 and 405 of FIG. 4 and steps 501, 502, 504, and 505 of FIG. 5.

Referring to FIG. 5, in step 501, display device 208 continuously monitors whether storage device 206 communicates that a first frame is ready for display.

Referring to FIG. 4, in step 401, decoder device 204 inspects frames from video source 202 and determines whether to adjust a time stamp. In accordance with an embodiment of the present invention, for frames encoded in 3:2 format, decoder device 204 adjusts the time stamp of every other frame. Specifically, in this embodiment, decoder device 204 modifies time stamps of every other frame, represented by $t_B$, to be $t_B'$, as specified in the following equation:

$$t_B'=t_A+(4/5)(t_B-t_A).$$

where $t_A$ represents a time stamp of a prior frame separated from the frame having a time stamp, $t_B$, by one frame.

Recall that frames encoded in 3:2 format are to be displayed in interlaced mode. In this embodiment, for frames encoded in 3:2 format but are to be displayed in progressive mode, frame rate converter 200 provides each frame to monitor device 212 in a sequential order. Thus, for frames in 3:2 format, step 401 effectively removes the time skew of the time stamp of every other frame so that each frame may be displayed at proper times in a sequential order. As such, this embodiment avoids jutter associated with the 3:2 format discussed earlier.

In step 402, decoder device 204 stores an available frame in storage device 206.

In step 403, storage device 206 determines whether it is a proper time to display a frame. Storage device 206 includes a counter that counts clock cycles of clock 210. Storage device 206 selects the frame with a time stamp that matches the value in its counter. In this example, Frame A, has a time stamp that matches the value in the counter.

In step 404, storage device 206 communicates to display device 208 that a Frame A, is ready for display by signaling display device 208 to load a frame. FIG. 3 depicts time t0 that storage device 206 communicates to display device 208 that Frame A is available.

In step 502 of FIG. 5, display device 208 loads an available frame, Frame A, from storage device 206 and provides Frame A to monitor device 212 shortly after time t0. In step 405 of FIG. 4, storage device 206 monitors and determines that display device 208 loads a frame from storage device 206.

In step 503 of FIG. 5, display device 208 continuously monitors whether monitor device 212 has completed displaying the current displayed frame, Frame A. Referring to FIG. 3, at time t1, monitor device 212 completes display of Frame A and in step 504 of FIG. 5, display device 208 determines whether it received a frame-ready signal from storage device 206 associated with a next available frame (Frame B). Frame B is not available and so in step 506 (FIG. 5), display device 208 commands monitor device 212 to repeat the frame it just finished displaying (Frame A) shortly after time t1. The time between completion of a frame and a start of repeating Frame A is unnoticeable to the human eye.

In this embodiment, to avoid tearing, monitor device 212 completes displaying a frame prior to display device 208 providing a different frame. Were display device 208 to provide a different frame prior to monitor device 212 completing display of a pending frame, the monitor device 212 could potentially "tear" a frame, i.e., display parts of two different frames in a single refresh operation.

Subsequent to completing step 405 of FIG. 4, decoder device 204 and storage device 206 perform step 406, which is similar to step 401 described earlier, and steps 402–404 described earlier to adjust time stamps where applicable and alert display device 208 that a next frame, Frame B, is available from storage device 206. Referring to FIG. 3, at time t2, decoder device 204 communicates to display device 208 that Frame B is ready for display.

At time t3, display device 208 senses that monitor device 212 completed displaying Frame A (step 503, FIG. 5). Display device 208 senses the frame-ready signal (step 504, FIG. 5) and immediately fetches Frame B from storage device 206 and provides Frame B to monitor device 212 (step 505, FIG. 5) shortly after time t3. The time between completion of Frame A (step 503) and availability of Frame B (step 505) is unnoticeable to the human eye. In step 405 of FIG. 4, decoder device 204 monitors and determines that display loads a frame from storage device 206.

At time t4 (FIG. 3), display device 208 determines that monitor device 212 completed displaying Frame B (step 503, FIG. 5). Display device 208 does not detect that a next frame is ready (step 504, FIG. 5) and so display device 208 commands monitor device 212 to repeat Frame B (step 506, FIG. 5).

Subsequent to completing step 405 of FIG. 4, decoder device 204 and storage device 206 perform steps 406 and 402–404 of FIG. 4 described earlier to adjust time stamps where applicable and alert display device 208 that a next frame, Frame C, is available from storage device 206. Referring to FIG. 3, at time t5, decoder device 204 communicates to display device 208 that Frame C is ready for display.

However, display device 208 waits until monitor device 212 completely displays Frame B, time t6, (step 5033, FIG. 5) and then determines that Frame C is available (step 504, FIG. 5). Display device 208 loads Frame C from storage device 206 and provides Frame C to monitor device 212 shortly after time t6 (step 505, FIG. 5). Decoder device 204 detects that display device 208 loads Frame C (step 405, FIG. 4).

Even though in this embodiment, monitor device 212 does not display a new frame prior to monitor device 212 completely displaying a frame, the error in time ("error time") that a frame should be displayed, specified by a time stamp, versus the time that the frame is actually displayed is a minimum. The decoder device 204 ensures that a frame is available prior to the time it should be displayed. Display device 208 ensures the frame is displayed close to the time it should be displayed. At any instant, the worst time error is 1/R, assuming R is greater than F. The total error is non-accumulating and so a minimum time error results over the span of the videostream.

In an embodiment of the present invention, frame rate converter 200 includes logic circuitry that sets the refresh rate of the monitor device 212. In conventional computer display devices, a conventional graphics card controls the refresh rate R of monitor device 212. The refresh rate R of the conventional graphics card is programmable. Thus in this embodiment frame rate converter 200 controls the refresh rate R of a conventional graphics card that controls the refresh rate of monitor device 212. In this embodiment, frame rate converter 200 programs a refresh rate of a display as 72 Hz. In this embodiment, a refresh rate of 72 Hz provides optimal video appearance, i.e. a clear and bright picture. However, the refresh rate which provides an optimal video clarity and brightness can change. An optimal refresh rate could be a higher or lower frequency than 72 Hz where an optimal clarity and brightness of a video image requires such refresh rate. The optimal clarity and brightness is subjective and could be established by the viewer.

Figure 6:
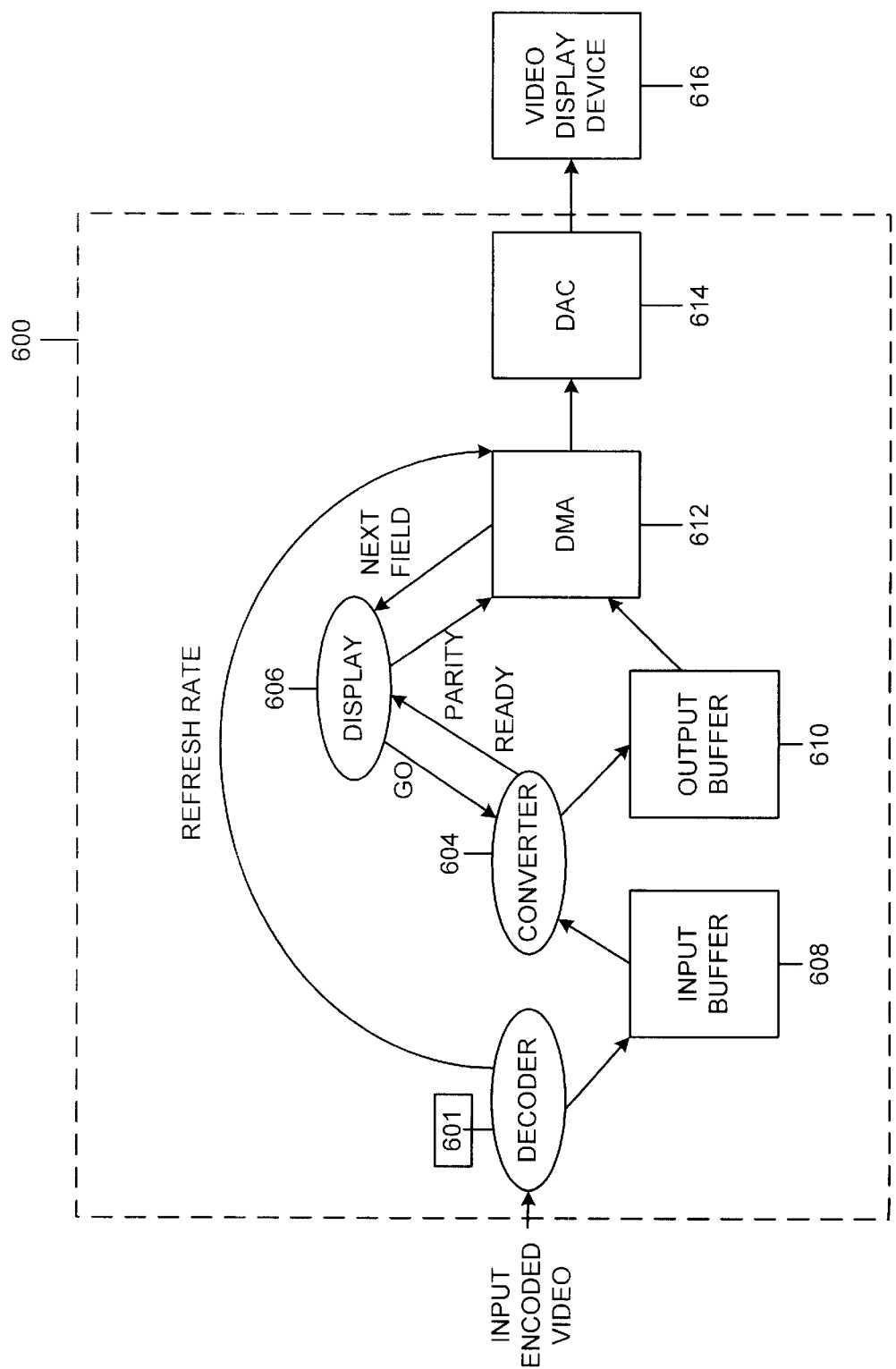
FIG. 6 depicts schematically a system 600 in accordance with an embodiment of the present invention.

FIG. 6 depicts schematically a system 600 in accordance with an embodiment of the present invention. Like frame rate converter 200, described earlier, system 600 provides minimal error between the time a field should be displayed and the time the field is available for display. System 600 further performs field modification where needed to ensure that sequentially displayed fields alternate in parity, i.e., top then bottom or bottom then top.

In system 600, a microprocessor executes the code segments represented by decoder 602, converter 604, and display 606. In system 600, input buffer 608 and output buffer 610 represent memory allocations in a memory unit. In this embodiment, the input buffer has capacity to store at least 3 frames of 720 by 480 NTSC format pixels. The output buffer 610 includes two subbuffers, 610A and 610B (not depicted) for storing a respective "top field", i.e., a field including a top displayable line, and "bottom field", i.e., a field including a next-to-top displayable line. Each of the input and output buffers has an associated state register that indicates whether a buffer is in "ready", "done", or "busy" state. Each of the subbuffers 610A and 610B includes 1) a register indicating the parity of its contents and 2) a register indicating whether the field is to be displayed first.

Conventional interlaced direct memory access device (DMA) 612 reads lines of video in interlaced order from distinct memory locations in the output buffer. Conventional interlaced digital-to-analog converter (DAC) 614 converts the lines into analog signals for display in interlaced mode by a conventional video display device 616 such as a television.

An MPACT2!™, available from Chromatic Research, provides a suitable microprocessor and interlaced DMA 612 and interlaced DAC 614. A suitable memory module is a Rambus™ specification memory module storing at least 4 megabytes (MB) such as model G02404 available from Toshiba. An exemplary circuit board as available from STB of Plano, Tex. couples the microprocessor and memory unit.

Figure 7:
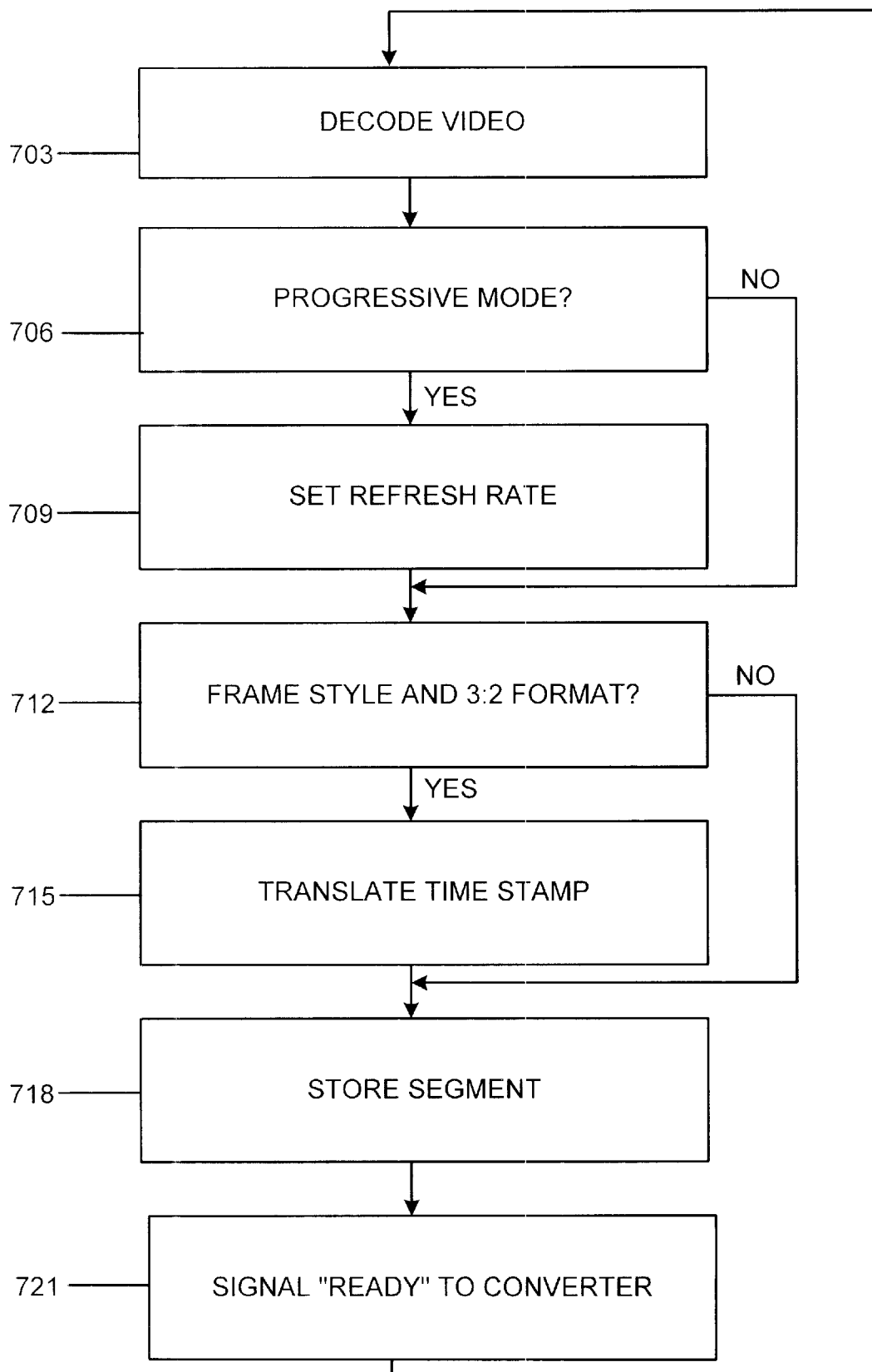
FIG. 7 depicts an exemplary process of decoder 602 in accordance with an embodiment of the present invention.

FIG. 7 depicts an exemplary process of decoder 602. In step 703, the decoder 602 decodes encoded video, e.g., in MPEG-1 or MPEG-2 formats, using a conventional decoding process such as described in Digital Video: An Introduction to MPEG-2, B. Haskell, A. Puri, and A. Netravali, Chapman and Hall. The decoder thereby outputs either a frame or even and odd fields. The encoded video includes information such as the mode of display, i.e., progressive or interlaced, the refresh rate, and the type, i.e., frame or field.

At step 706, the decoder 602 determines if the mode of the video is progressive. If so, the next step is 709, otherwise the next step is 712. If the mode is progressive and the video is to be displayed within a maximum displayable area of video display device 616, i.e., without any borders, the decoder sets the refresh rate R of video having a frame rate, F, as specified in the following pseudocode:

if F is 24 frames/s, set R to 72 frames/s;
if F is 25 frames/s, set R to 75 frames/s;
if F is 30 frames/s, set R to 60 frames/s;
else, set R to 72 frames/s.

In this embodiment the decoder 602 sets refresh rate R of DMA 612 or 1014.

In step 712, the decoder 602 determines if 1) the decoded video is a frame type; 2) displayable in progressive mode; and 3) 3:2 format. If 1), 2), and 3) are true, then the next step is 715, otherwise the next step is 718. In step 715, decoder adjusts the time stamp of every other frame, $t_B$, to be $t_B'$, as specified in the following equation:

$$t_B' = t_A + (4/5)(t_B - t_A). \qquad \text{equation 2}$$

where $t_A$ represents a time stamp of a prior frame separated from the frame having a time stamp, $t_B$, by one frame In step 718, the decoder 602 stores the segment, i.e., frame or field, in input buffer 608.

In step 721, the decoder 602 signals that a segment is "ready". The decoder further communicates 1) the time stamp of the segment, 2) whether the segment is a field or frame type, 3) whether to repeat the first field, 4) whether the top field is first displayed, and 5) the address of the segment.

Figure 8:
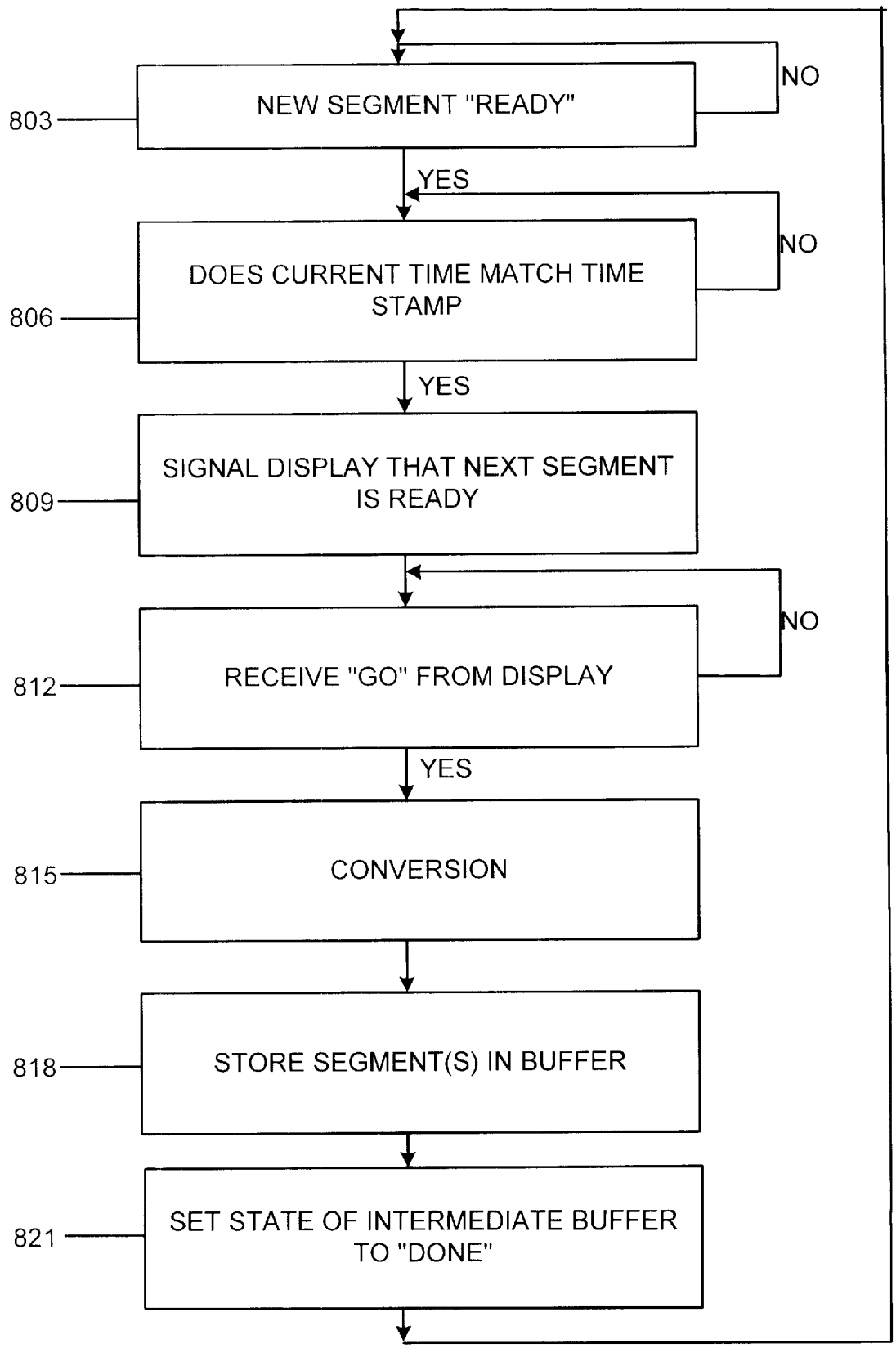
FIG. 8 depicts an exemplary process of converter 604 in accordance with an embodiment of the present invention.

FIG. 8 depicts an exemplary process of converter 604. In step 803, converter 604 determines if converter issued a "ready" signal. If not, then the converter repeats step 803, otherwise, then in step 806, the converter 604 compares the time stamp, issued with the "ready" signal from decoder 602 with current time. In this embodiment, a current time is recorded in a register and incremented at the same time matches the time stamp, then the next step is 809, otherwise the converter peats step 806.

In step 809, the converter signals "ready" to the display to indicate that a segment is available in input buffer. Next, the converter executes step 812 until detecting a "go" signal from the display 606. After detecting a "go" signal, in step 815, the display performs a conversion process that includes: 1) loading the frame or fields associated with the "ready" signal detected in step 803; 2) converting the MPEG macroblock format of the decoded segment from "4:2:0" to "4:2:2" in accordance with a process specified in Digital Video: An Introduction to MPEG-2; 3) either modifying the frame or fields into letter box format or into pan and scan format, as specified in accordance with a conventional process; 4) adjusting the gama, i.e., brightness, color, and hue, of the frame or fields as defined by the viewer; and 5) converting frames into even and odd fields, where one field is the top field, i.e., the field that includes the top displayable line, and the other field is the "bottom field". In this embodiment, after converting a frame to fields, the time stamp of the first displayed field ("first field") has the time stamp of its frame. The first displayed field can be either top or bottom parity. For frames encoded in 3:2 format, a time stamp adjusted in step 715 corresponds to a time stamp of a first field. The first field is also to field, i.e., "top first" in alternating frames having adjusted time stamps.

In step 818, the converter stores the top and bottom fields in corresponding subbuffers 610A and 610B of output buffer 610. Each of subbuffers 610A and 610B has 1) an associated "parity" register which specifies whether the stored field is a top or bottom field and 2) an associated register which indicates which field is to be displayed first (among the two fields). In this embodiment, in each execution of step 818 the converter stores a set of top and bottom fields. In step 821, the converter sets the state of each of subbuffers 610A and 610B to "done".

Figure 9A:
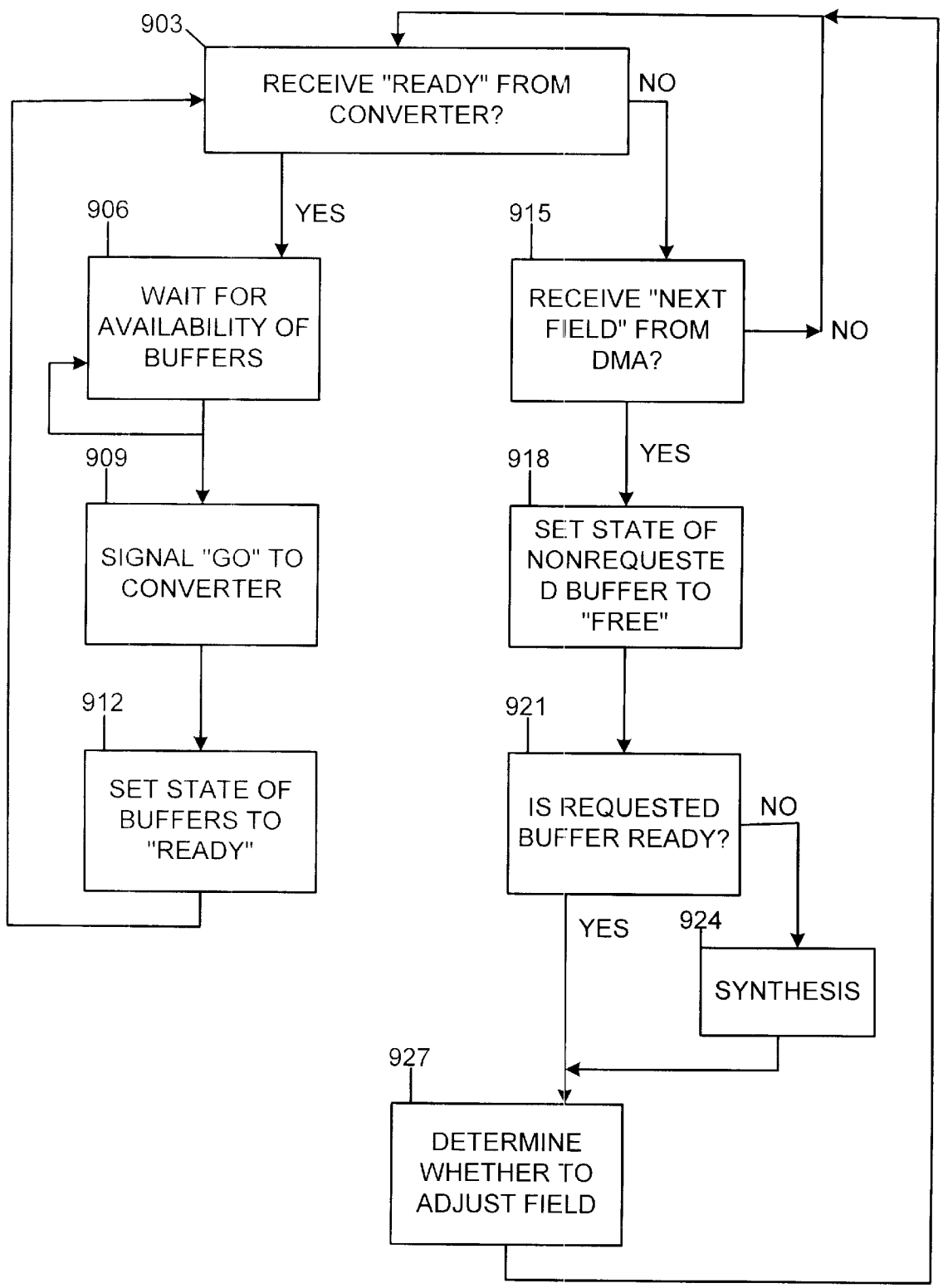
FIGS. 9A to 9C depict a process of display 606 in accordance with an embodiment of the present invention.
Figure 9B:
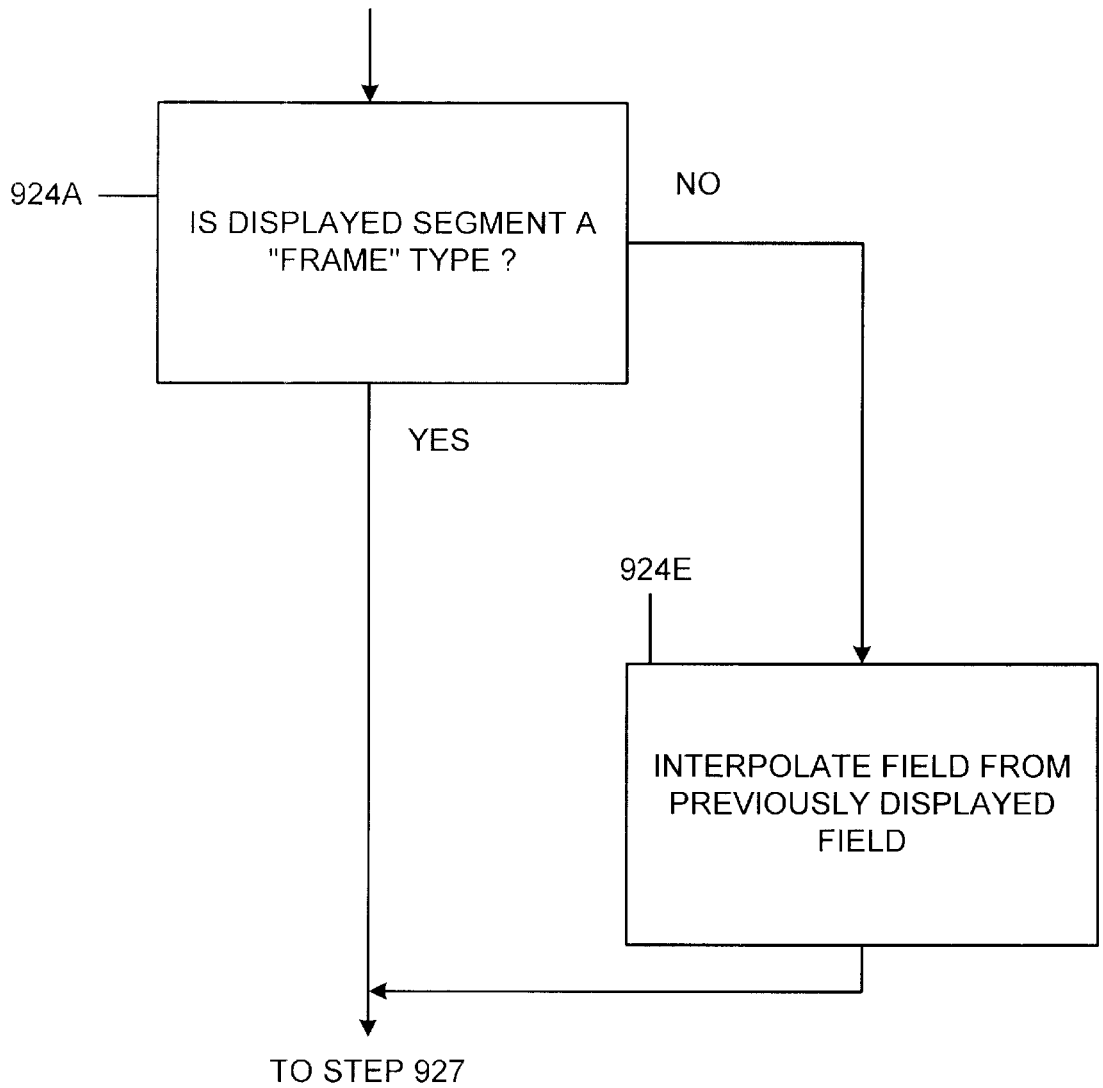
Figure 9C:
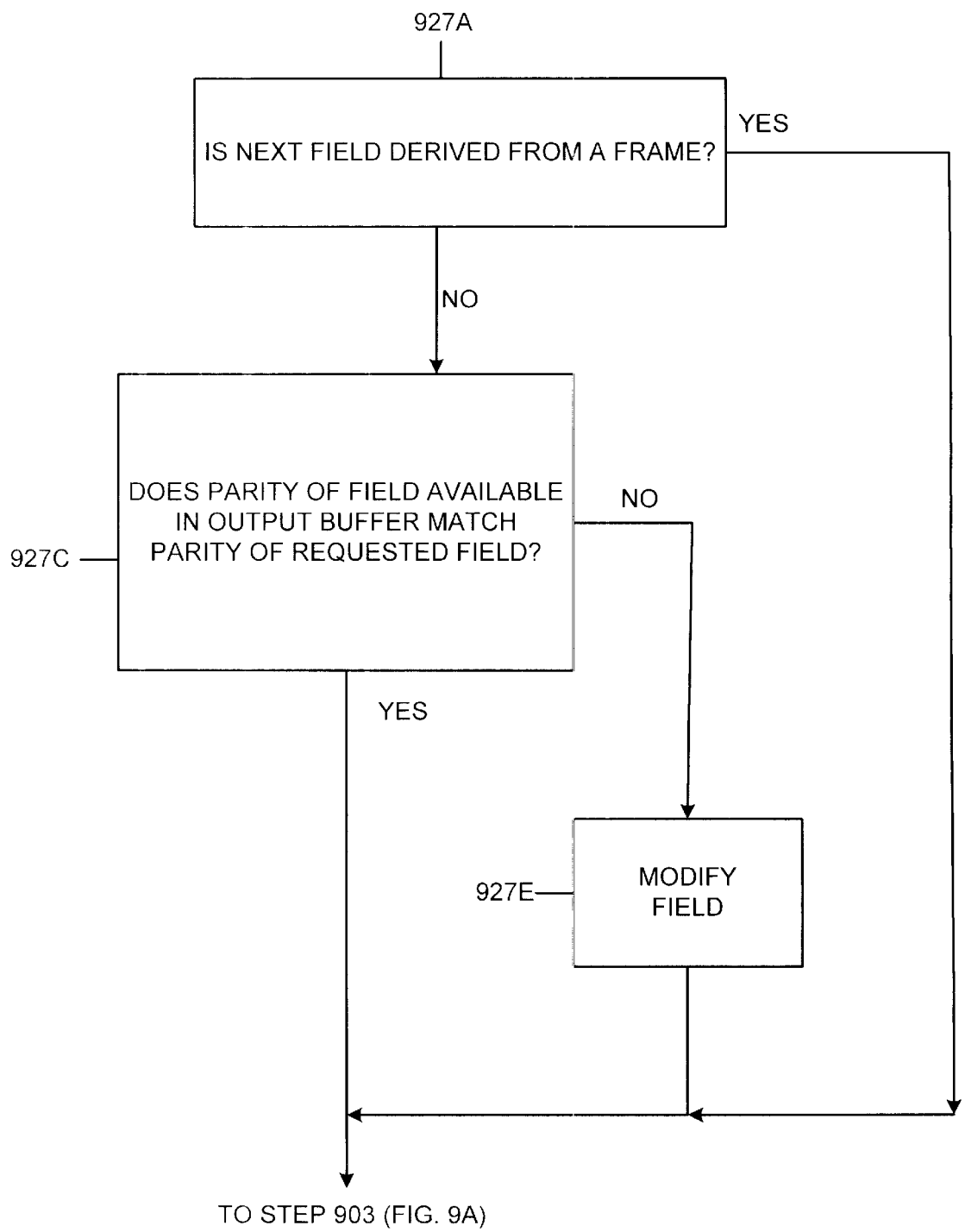

FIGS. 9A to 9C depict a process of display 606. In step 903, the display determines whether converter issued a "ready" signal (FIG. 8, step 809). If so, the next step is 906, otherwise the next step is 915.

In step 906, the display next determines whether the state of output buffer 610 is "free". In this embodiment, the "free" state corresponds to one subbuffer of the output buffer being in the "free" state and the other subbuffer being close to free, i.e., the interlaced DMA having read most of its contents. If so, then the next step is 909, otherwise step 906 repeats.

In step 909, display issues a "go" command to converter 604.

In step 912, display sets the state of output subbuffers 610A and 610B both to "ready". The next step is step 903.

In step 915, the display detects for a "next field" signal from the interlaced DMA 612. In this embodiment, the interlaced DMA 612 requests a field by specifying its parity, i.e., top or bottom (not depicted). If not detected, the next step is 903, but if detected, the next step is 918.

In step 918, the display sets the state of the output subbuffer that does not include the requested field to "free". Each subbuffer has a register that specifies a parity of its contents.

In step 921, the display determines if the requested buffer, i.e., the sub buffer that stores the requested field, is in the "ready" state. If so then the next step is 924, otherwise the next step is 927.

FIG. 9B depicts a process of step 924. In substep 924A, the display determines if the field from the requested subbuffer is originally a "frame" type, i.e., the field derives from a frame output of the step 815, described earlier. If so, then the next step is 927, otherwise the next step is 924E.

Where the field from the requested subbuffer is originally a "frame" type, both fields of the output buffer 612 have been displayed and so subsequently, the DMA 612 merely loads the field having a specified parity, i.e., opposite the parity of the field previously displayed. This scenario occurs for example where the two fields of output buffer are displayed and new fields are not available at the "next field" request, e.g., because the MPEG decode operation is too slow. If the next field and previously displayed field were both field type, i.e., they were not derived from a frame output of the step 815, then the fields are to be displayed at different times. Thus repeating a field displayed previously would create a "flash back", i.e., display of a field displayed earlier in time. However, where the fields derive from a single frame, the DMA can repeat a previously displayed field without a "flashback".

In substep 924E, where the fields in output buffer 610 were not derived from a frame in step 815, the display creates a next field having the requested parity by, e.g., shifting the most recently displayed field either up or down a half line and then storing the modified field in the subbuffer having the requested parity. Thereby the DMA 612 can load a field having the requested parity. The following pseudocode represents the action of substep 924E:

if the parity of the requested field is "bottom", shift most recently displayed field down ½ a line;

else shift most recently displayed field up ½ a line.

Figure 9D:
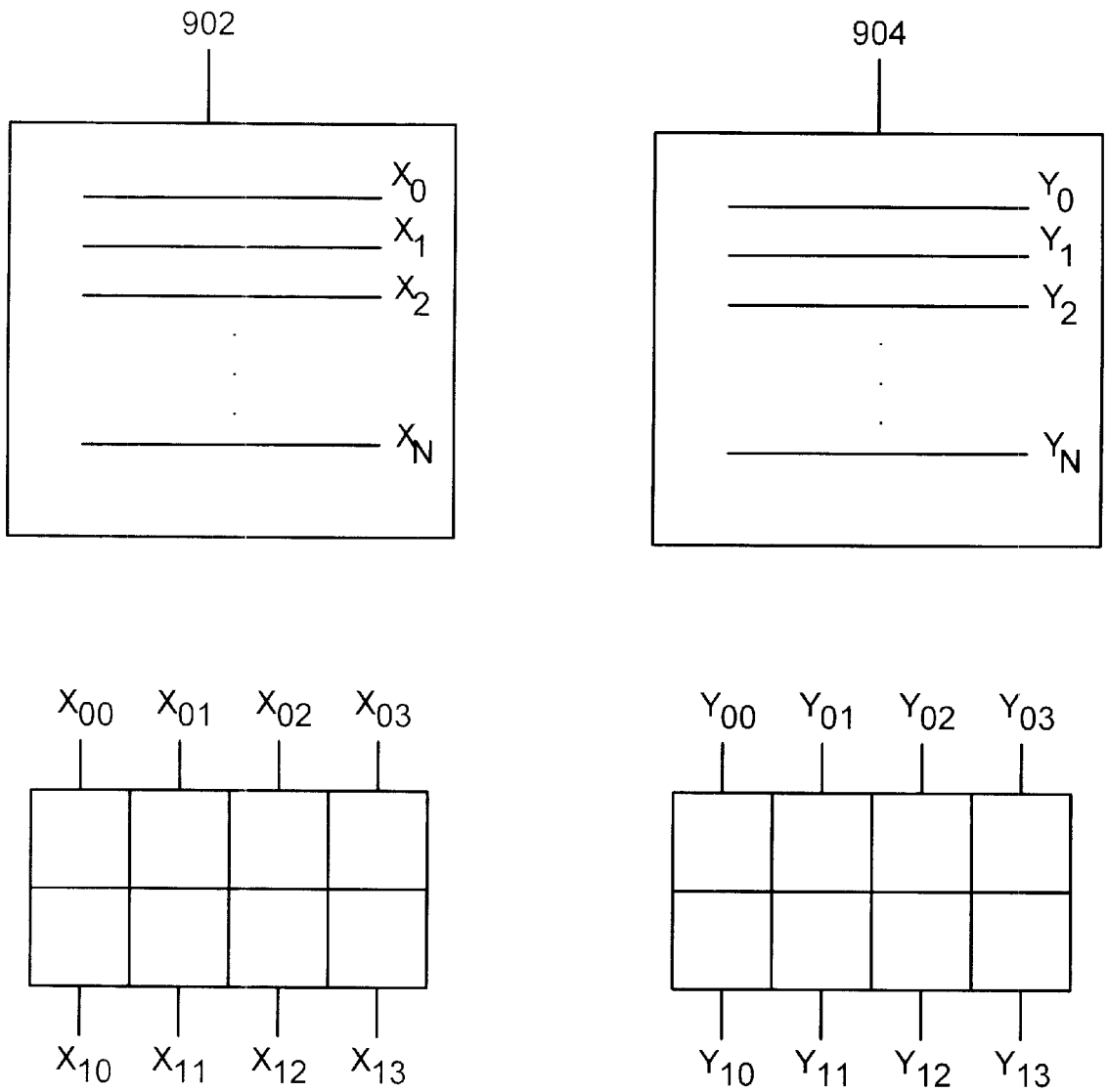
FIG. 9D depicts lines of a most recently displayed field (902) and lines of a next field (904).

FIG. 9D depicts lines of a most recently displayed field (902) and lines of a next field (904). In the following equations, variables $Y_0$ to $Y_N$, represent respective lines 0 to N of the next field 904 and variables $X_0$ to $X_N$, represent respective lines 0 to N of the most recently displayed field 902, where the most recently displayed field is a bottom field:

$Y_0 = X_0$
$Y_1 = (X_0 + X_1)/2$
$Y_2 = (X_1 + X_2)/2$
...
...
$Y_N = (X_{N-1} + X_N)/2$

The most recently displayed field 902 is one half a line shifted down relative to the next displayed field 904. Thus, to ensure that the next field 904 appears in the proper position when displayed, in substep 924E, the display shifts lines of the most recently displayed field up a half line.

Otherwise where the most recently displayed field is a top field, in substep 924E, the display shifts lines of the most recently displayed field down a half line. In the following equations, variables $Y_0$ to $Y_N$, represent respective lines 0 to N of the next field 904 and variables $X_0$ to $X_N$, represent respective lines 0 to N of the most recently displayed field 902, where the most recently displayed field is a top field:

$Y_N = X_N$
$Y_{N'} = (X_{N-1} + X_N)/2$
...
...
$Y_0 = (X_1 + X_0)/2$

In practice, each field is represented as components, i.e., luminance, chrominance-red, and chrominance-blue. The formula is applied to derive components for each pixel of each line of next field 904 from components of pixels of the most recently displayed.

Thus for example, referring to FIG. 9D, where display shifts lines of the most recently displayed field up a half line, $Y_{11}$, which represents a luminance component of a next pixel having coordinates (1,1), i.e., second to top row, second to leftmost pixel, is represented by the following formula:

$$Y_{11} = (X_{01} + X_{11})/2$$

where $X_{01}$ and $X_{11}$ represent luminance components of respective pixels having coordinates (0,1) and (1,1) of a most recently displayed field.

In interlaced mode, fields of alternating parities are displayed sequentially, i.e., top then bottom or bottom then top. Since the fields are of different times, in substep 924E, the display provides a next field having an opposite parity of a most recently displayed field by shifting it up or down and thereby a next field has a parity opposite of the parity of the most recently displayed field. However, repeating the most recently displayed field introduces "jutter" which is more tolerable than "flashback".

In step 927, the display determines whether to adjust the next field, by the substeps shown in FIG. 9C. In substep 927A, the display determines whether the next field is originally derived from a frame (step 815). If so the next step is 903 (FIG. 9A) otherwise, substep 927C follows.

In substep 927C, the display determines if a field in the output buffer 610, having a parity that matches the parity of the requested field, and is also a first field. If so, then substep 927E follows, otherwise step 903 (FIG. 9A) follows. In this embodiment, each subbuffer of output buffer 610 has a register which indicates whether the subbuffer stores a first field, i.e., field that is to be displayed first.

In substep 927E, the display modifies the field having a parity opposite the requested parity ("opposite field") by moving each line either up or down one half a line in a process similar to that described with respect to substep 924E. If the requested field has a bottom parity, the opposite field is a top field and is shifted down one half a line or if the requested field has a top parity, the opposite field is a bottom field and is shifted up one half a line. After modifying the opposite field, the display stores the opposite field in the subbuffer having a same associated parity as the opposite field.

Thereby, the DMA 612 will load a field being most recently displayed but having the requested parity. Thus a toggling parity sequence can be preserved. A drawback of repeating a field is the "jutter" described earlier.

Figure 10:
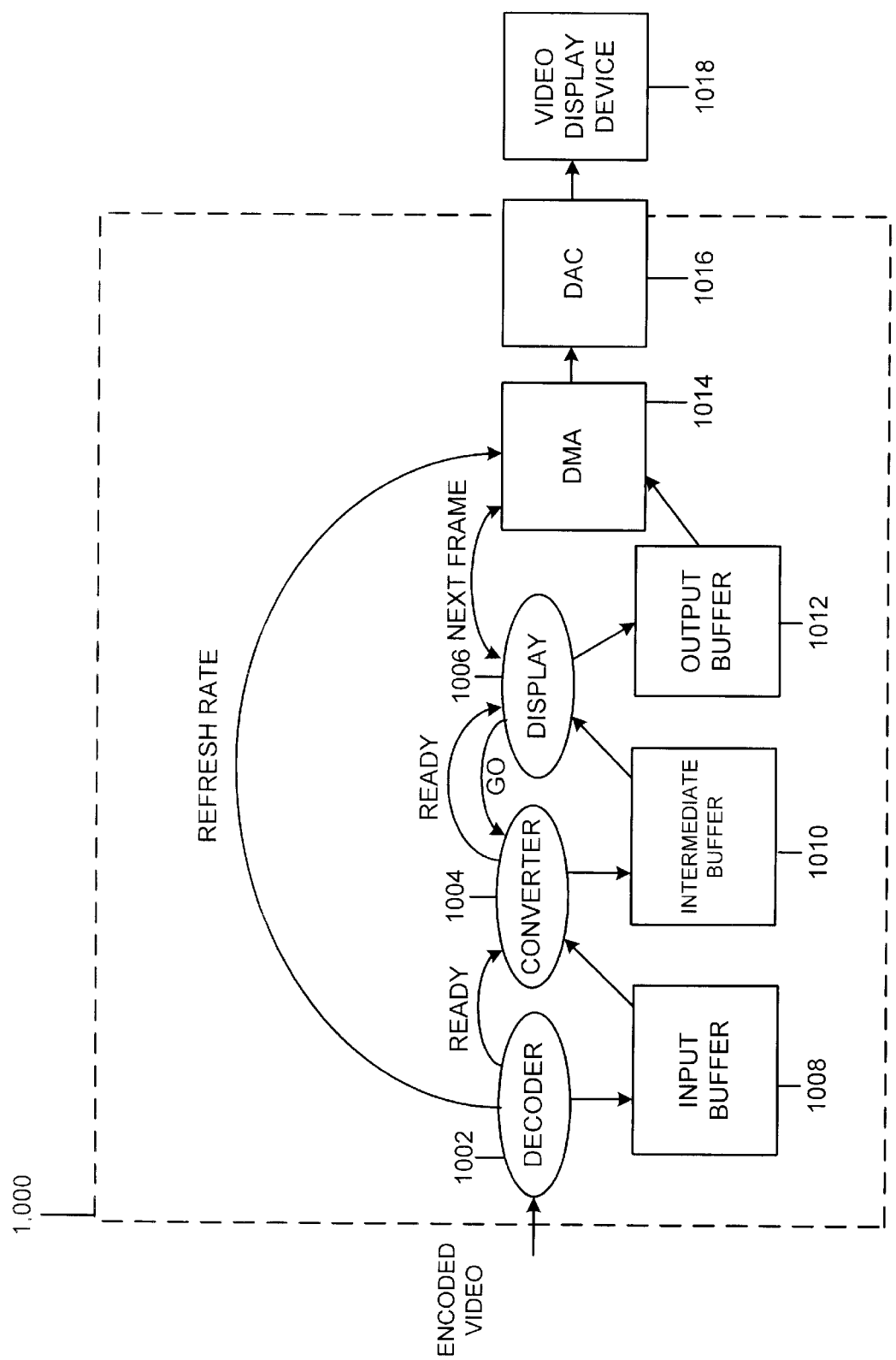
FIG. 10 depicts schematically a system 1000 in accordance with an embodiment of the present invention.

FIG. 10 depicts schematically a system 1000 in accordance with an embodiment of the present invention. Similar to the frame converter 200, described earlier, system 1000 provides minimal error between a time a frame should be displayed and the time the frame is available for display and also adjusts time stamps of 3:2 format frames to be displayed in progressive mode.

In system 1000, a microprocessor executes the code segments represented by decoder 1002, converter 1004, and display 1006. Input buffer 1008, intermediate buffer 1010, and output buffer 1012 represent memory allocations in a memory unit. In this embodiment, the input buffer 1008 has capacity to store at least 3 frames being 720 by 480 NTSC format pixels. Intermediate buffer 1010 and output buffer 1012 each store a single frame. Each of the buffers has an associated state register that indicates whether a buffer is in "ready", "done", or "busy" state.

Conventional progressive direct memory access device (DMA) 1014 reads lines of video in progressive order from output buffer 1012, i.e., sequentially from a top line to a bottom line. Conventional digital-to-analog converter (DAC) 1016 converts the lines into analog signals for display in progressive mode by a conventional video display device 1018 such as a computer monitor.

A suitable microprocessor, memory device, a circuit board are described with respect to system 700. The MPACT2! microprocessor also includes the conventional DMA device and conventional progressive DAC.

A suitable process for decoder 1002 is similar to that described with respect to decoder 602. A suitable process for converter 1004 is similar to that described with respect to converter 604, except 1) at step 815, instead of converting frames into even and odd fields, the decoder 1002 converts any fields into frames using a "de-interlacing" process described in U.S. Patent Application entitled "An Improved Deinterlacing Technique", Ser. No. 09/219,469, filed Dec. 23, 1998, attorney docket number M-6000 US; and 2) at step 818, the decoder 1002 stores a decoded frame into the intermediate buffer.

Figure 11:
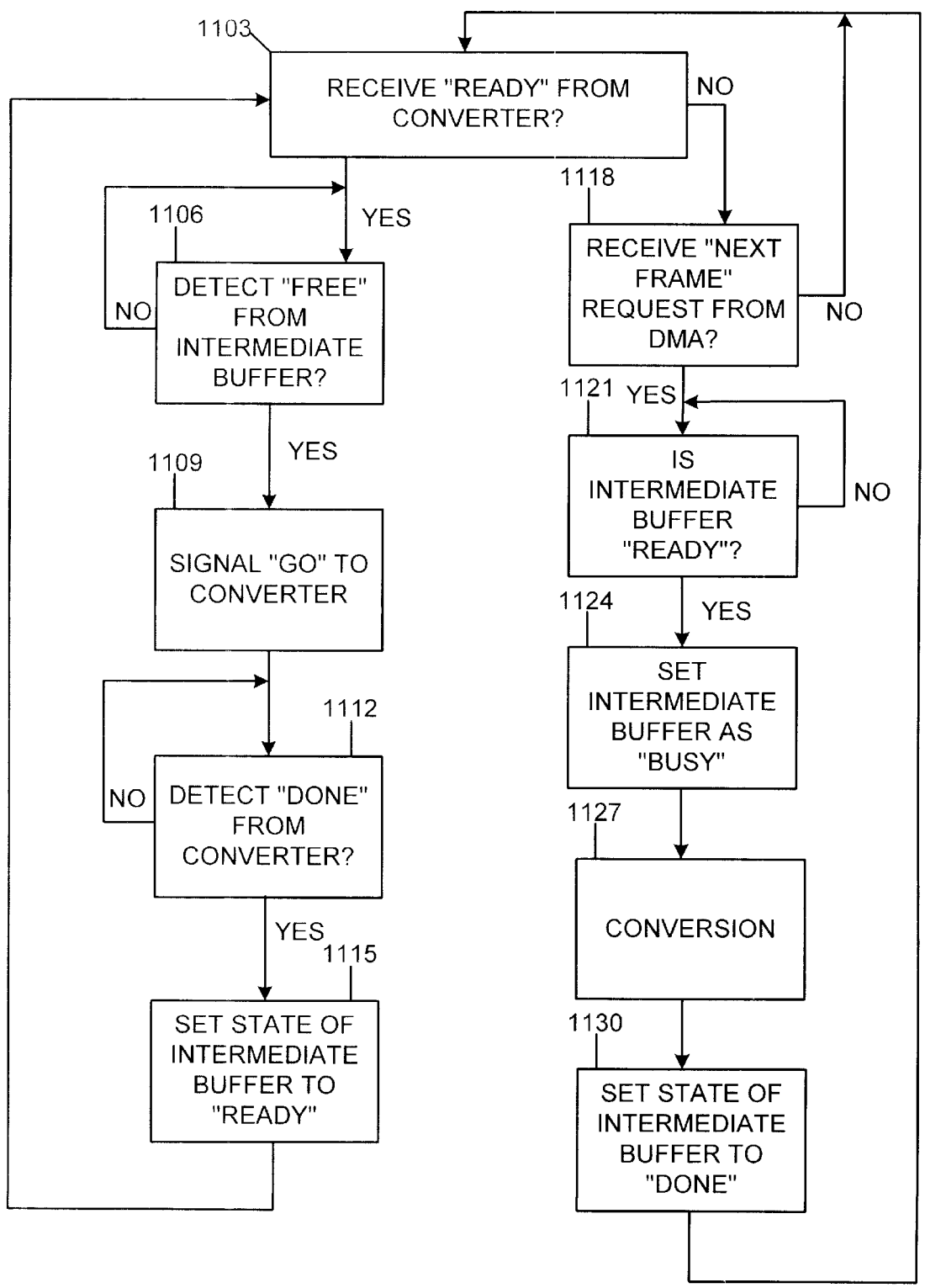
FIG. 11 depicts an exemplary process of display 1006 in accordance with an embodiment of the present invention.

FIG. 11 depicts an exemplary process of display 1006. In step 1103, the display determines whether converter issued a "ready" signal (FIG. 8, step 809). If so, the next step is 1106, otherwise the next step is 1118. In steps 1106 to 1115, the display manages storing to the intermediate buffer 1010 by converter 1004. In steps 1118 to 1130, the display manages the transfer of frames from the intermediate buffer 1010 to the output buffer 1012.

In step 1106, the display determines whether the state of the intermediate buffer is "free". If so then the next step is 1109, otherwise step 1106 repeats.

In step 1109, the display issues a "go" signal to converter.

In step 1112, the display determines if the converter issues a "done" signal. If so, the next step is 1115, otherwise step 1112 repeats.

In step 1115, the display sets the state of the intermediate buffer to "ready".

In step 1118, the display next determines if progressive DMA signaled a "next frame" request. If not then the next step is 1103, otherwise the next step is 1121.

In step 1121, the display determines if the intermediate buffer is in the "ready" state. If so the next step is 1124, otherwise the step 1121 repeats.

In step 1124 the display sets the state of the intermediate buffer to "busy".

In step 1127, the display performs a conversion routine that includes 1) loading a frame in the intermediate buffer; 2) converting the format of the frame defined as luminance, chrominance-red, and chrominance-blue to being defined in terms of red, green, and blue using a process described in "Digital Video: An Introduction to MPEG-2"; 3) where indicated by the user, clipping the frame using a conventional process; 4) where indicated by the user, scaling the frame where indicated using a conventional process; and 5) storing the frame to the output buffer.

In step 1130, the display sets the state of the intermediate buffer to "done".

The above-described embodiments of the present invention are illustrative and not limiting. It will thus be obvious to those skilled in the art that various changes and modifications may be made without departing from this invention in its broader aspects. For example, the operations described with respect to FIGS. 4 and 5 could be in software form and executed by a computer. For example, where the monitor device 212 displays video in progressive mode, the frame rate converter 200 provides frames to the monitor device 212 and therefore does not convert any decoded frames into fields or perform time stamp adjustment in steps 401 and 406. For example, the order of steps in FIGS. 4, 5, 7, 8, 9A–9C, and 11 can be altered. The steps of FIGS. 7, 8, 9A–9C, and FIG. 11 can be implemented in hardwired logic. For example, the systems 600 and 1000 can be combined so that input video can be displayed in either or both progressive or interlaced video display devices. Therefore, the appended claims encompass all such changes and modifications as fall within the scope of this invention.

What is claimed is:

1. A frame rate converter that receives segments having an input frame rate and provides segments at a rate of N times said frame rate, wherein said segment is selected from a group consisting of a frame or field, comprising:
   a memory device which stores decoded video segments, wherein said decoded video segments includes a first, second, and third segments; and
   a display device coupled to receive said decoded video segments from said memory device and to provide said first, second, and third segments, wherein said display device provides said first segment and then provides said second segment following completion of providing said first segment where said second segment is previously available or otherwise again provides said first segment.

2. The frame rate converter of claim 1, further comprising a decoder device, wherein said third segment comprises a top first field derived from a frame encoded in 3:2 format and wherein said decoder device adjusts a time stamp of said third segment.

3. The frame rate converter of claim 1 wherein said memory device is coupled to circuitry operative to communicate to said display device to retrieve said second segment when it is available.

4. The frame rate converter of claim 3 wherein said availability comprises a time stamp of said second segment matching a counter value.

5. The frame rate converter of claim 1 wherein N is approximately 3.

6. The frame rate converter of claim 5 wherein said frame rate is approximately 24 frames/second.

7. A method of receiving segments having an input frame rate and providing said segments at a rate of N times said frame rate, wherein said segments are selected from a group consisting of a frame or field and said segments include a first, second, and third segments, comprising the acts of:
   displaying a first segment at a rate of said N times said frame rate;
   determining whether a second of the corresponding segments is available for display;
   selecting said second segment as a selected segment if said second segment is available, otherwise selecting said first segment as said selected segment; and
   displaying said selected segment following completion of said displaying said first segment.

8. The method of claim 7 further comprising adjusting a time stamp of said third segment, wherein said third segment comprises a top first field derived from a frame encoded in 3:2 format.

9. The method of claim 7 wherein said available comprises a time stamp associated with said second segment matching a counter value.

10. The method of claim 7 wherein said N is approximately 3.

11. The method of claim 10 wherein said frame rate is approximately 24 frames/second.

12. A frame rate converter that receives segments having an input frame rate and provides segments at a rate of N times said the frame rate, wherein said segment is selected from a group consisting of a frame or field, comprising:
   a storage device which stores segments, wherein said segments include a first, second and third segments;
   a decoder device, coupled to the storage device, operative to adjust a time stamp of said third segment, wherein said third segment further comprises a top first field derived from a frame encoded in 3:2 format; and
   a display device coupled to receive said segments from said storage device and to provide said first, second and third segments, wherein said display device provides said first segment and then provides said second segment following completion of providing said first segment where said second segment is previously available or otherwise again provides said first segment.

13. The frame rate converter of claim 12, wherein said storage device communicates to said display device to retrieve said second segment when it is available.

14. The frame rate converter of claim 13, wherein said availability comprises a time stamp of said second segment matching a counter value.

15. The frame rate converter of claim 12, wherein N is approximately 3.

16. The frame rate converter of claim 15, wherein said frame rate is approximately 24 frames/second.

17. A method of receiving segments having an input frame rate and providing said segments at a rate of N times said frame rate, wherein said segments are selected from a group consisting of a frame or field and said segments include a first, second and third segments, comprising:
   displaying a first segment at a rate of said N times said frame rate;
   selecting a second segment as a selected segment if said second segment is available, otherwise selecting said first segment as said selected segment;
   displaying said selected segment following completion of said displaying said first segment; and
   adjusting a time stamp of said third segment, wherein said third segment comprises atop first field derived from a frame encoded in 3:2 format.

18. The method of claim 17, wherein said available comprises a time stamp associated with said second segment matching a counter value.

19. The method of claim 17, wherein N is approximately 3.

20. The method of claim 19, wherein said frame rate is approximately 24 frames/second.

* * * * *